(12) United States Patent
Bolt et al.

(10) Patent No.: US 7,192,012 B2
(45) Date of Patent: **\*Mar. 20, 2007**

(54) AIR SUSPENSION SYSTEM WITH SUPPLY AIR RESTRICTION VALVE

(75) Inventors: David Bolt, Grand Haven, MI (US); Victor A. Plath, Nunica, MI (US)

(73) Assignee: Haldex Brake Corporation, Kansas City, MO (US)

( * ) Notice: Subject to any disclaimer, the term of this patent is extended or adjusted under 35 U.S.C. 154(b) by 74 days.

This patent is subject to a terminal disclaimer.

(21) Appl. No.: 11/064,182

(22) Filed: Feb. 23, 2005
(Under 37 CFR 1.47)

(65) Prior Publication Data
US 2005/0248069 A1    Nov. 10, 2005

Related U.S. Application Data

(63) Continuation-in-part of application No. 10/643,070, filed on Aug. 18, 2003, now Pat. No. 6,935,625.

(51) Int. Cl.
*B60G 17/00* (2006.01)

(52) U.S. Cl. .............................. 267/64.16; 280/124.16

(58) Field of Classification Search ............. 267/64.16; 280/5.507–5.514, 124.157–124.16
See application file for complete search history.

(56) References Cited

U.S. PATENT DOCUMENTS

| | | | |
|---|---|---|---|
| 4,726,571 A | 2/1988 | Smith et al. | |
| 4,971,360 A | 11/1990 | Pischke et al. | |
| 4,993,729 A | 2/1991 | Payne | |
| 5,046,754 A | 9/1991 | Kimura et al. | |
| 5,048,867 A | 9/1991 | Gradert | |
| 5,159,554 A | 10/1992 | Buma et al. | |
| 5,333,645 A | 8/1994 | Galazin | |
| 5,335,695 A | 8/1994 | Pierce | |
| 5,344,189 A | 9/1994 | Tanaka et al. | |
| 5,430,647 A | 7/1995 | Raad et al. | |
| 5,711,150 A | 1/1998 | Oshita et al. | |
| 6,089,551 A | 7/2000 | Haviland et al. | |
| 6,264,213 B1 | 7/2001 | Kutscher | |
| 6,332,623 B1 | 12/2001 | Behmenburg et al. | |
| 6,491,307 B1 | 12/2002 | Charzinski et al. | |
| 6,669,217 B2 | 12/2003 | Sorum et al. | |
| 2002/0096840 A1 | 7/2002 | Sulzyc et al. | |

FOREIGN PATENT DOCUMENTS

WO    WO 01/89863 A2    11/2001

*Primary Examiner*—Christopher P. Schwartz
(74) *Attorney, Agent, or Firm*—St. Onge Steward Johnston & Reens LLC (57) ABSTRACT

A control system, primarily for use with a vehicle, which increases ride stability and minimizes cycling of the control system during normal operation of the vehicle by utilization of a restriction valve to restrict the fluid introduced into or exhausted from a fluid bag in response to a received control signal.

17 Claims, 12 Drawing Sheets

Figure 6

AIR SUSPENSION SYSTEM WITH SUPPLY AIR RESTRICTION VALVE

This application is a continuation-in-part of U.S. patent application Ser. No. 10/643,070 filed Aug. 18, 2003 now U.S. Pat. No. 6,935,625.

FIELD OF THE INVENTION

The invention relates to height control valves in vehicles suspensions and, more particularly, to an air restriction valve utilized in conjunction with a height control valve or a leveling valve.

BACKGROUND OF THE INVENTION

Air suspension systems are increasingly being utilized in vehicle suspensions, seats and cabs on semi-tracker/trailer truck rigs and other vehicles. Generally, air suspension systems include a height control valve that maintains a specified or selected height of the suspension. For instance, in semi-tracker/trailer truck rigs, the specified height is the distance between the vehicle frame and the axle. The air suspension system will sense any change in the specified height and will adjust the air pressure in the springs located between the vehicle frame and the axle. In this manner, the air suspension system maintains the specified height between the vehicle frame and the axle even with varying load weights.

The height control valve operates by selectively supplying air to, or exhausting air from, an air spring, which is located between the trailing arm and the vehicle frame. The trailing arm is provided to carrying the axle such that adjusting the air spring will correspondingly adjust the distance between the axle and the vehicle frame. Generally, the height control valve is mounted to the vehicle frame and is provided with a control arm that is connected to the trailing arm via a linkage arrangement. In this manner, as the distance between the trailing arm and the vehicle frame varies, the linkage arrangement will cause the control arm to rotate a control shaft inside the height control valve, which then controls the introduction to or exhaustion of air from the air spring. Although mechanical linkages are widely utilized to measure the varying distance between the axle and vehicle frame, other measurement transducers may be effectively utilized, such as light sensors, variable capacitors, variable resistors or any other appropriate transducer.

Generally, the height control valve comprises three air ports, an air spring port that is connected to the air spring, an inlet port that is connected to a pressurized air source and an exhaust port that is open to the atmosphere. In order to decrease the distance from the vehicle frame and the axle, the height control valve opens fluid communication between the air spring port and the exhaust port, thereby allowing pressurized air from the air spring to exhaust out to the atmosphere through the control valve. In order to increase the distance from the vehicle frame and the axle, the height control valve opens fluid communication between the inlet port and the air spring port, thereby allowing pressurized air from the pressurized air source to enter the air spring through the control valve. When the air spring is at a selected height, the valve is in a neutral position, such that the air spring port is isolated from both the inlet port and the exhaust port.

During normal operation of the vehicle, especially with heavy loads, the semi tracker/trailer will have a tendency to sway back-and-forth, from side-to-side, front -to-back or both, and oscillate due to, for instance, uneven road surfaces, weather conditions or even change in vehicle direction. These weight shifts, in turn, will cause an expansion and contraction of the distance between the axle and the vehicle frame, which will be measured by the air suspension system. The air suspension system will respond to the varying distance between the axle and vehicle frame by alternately exhausting air from and introducing air into the respective air spring to maintain the selected height between the axle and vehicle frame. It is unnecessary to maintain the selected height in this manner during vehicle operation. In fact, this constant cycling of the system is highly undesirable as it greatly reduces the lifespan of the equipment, resulting in higher maintenance costs and more vehicle down time while it is being serviced or repaired.

Varying of the air suspension system is generally utilized when, for instance, the semi tracker/trailer approaches a loading dock and the trailer height must be adjusted to match the height of the loading dock, or for connecting or disconnecting the tracker to the trailer. In addition, while the trailer is being loaded, it is advantageous for the height control valve to automatically adjust the height of and to level the trailer. However, once the height is selected and the trailer is leveled, based upon the load, it is undesirable to continually adjust the height between the axle and the vehicle frame due to minor variations in distance. However, sudden shifts in the load during vehicle operation may cause significant changes in the distance between the axle and the vehicle frame. In this case, it is important that the air suspension system adjust the air spring to maintain the selected height.

Various systems have been utilized in an attempt to minimize air consumption during normal operation of the air suspension system. The most common method has been to dampen or reduce the dynamic oscillations imparted on the valve through a mechanical damper integrated into the valve. Other methods have tried to profile the flow of air within the valve and then minimize the flow rates near the arm motions during normal operation. Both of these methods have proven moderately successful, but have not eliminated the problem.

Alternatively, electronic leveling systems have been utilized to minimize air consumption during normal operation of the air suspension system. For electronic leveling systems, a filtering algorithm is utilized in order to conserve air. This method is relatively effective, however, the cost of the electronic system is prohibitive making its usefulness in the market limited. While the electronic system may be superior to the other methods previously listed, the electronic system is also much more complicated to design, install, service and replace, further adding to the cost of the system.

U.S. Pat. No. 5,048,867 ("the '867 patent"), while directed towards solving a differing problem, namely making the actuating of the shut-off valve independent of the closure pressure loading the shut-off valve so that the valve can be furnished of small volume size, the '867 patent discloses a shut-off valve in series with a height control valve. ('867 patent, abstract and FIG. 1) However, both the height control valve and the directional control valve are controlled by control signals based on a height measuring device. ('867 patent, col. 9, lines 31–53) Therefore, the system disclosed and taught in the '867 patent will not minimize air losses to the air suspension system during normal operation of the vehicle because both the shut-off valve and the height control valve will react to oscillations of the vehicle by unnecessarily exhausting air from and adding air to the air springs based on a varying measured distance between the vehicle frame and the axel.

Therefore, what is desired is an air suspension system that will minimize cycling of equipment and air losses in the air suspension system while in normal operation of the vehicle.

It is also desired to provide a system that will selectively disconnect the control valve of the air suspension system during normal operation of the vehicle, based upon selected control criteria.

It is further desired to provide a system that will provide for various control input criteria, both manual and automatic, to selectively actuate the height control valve.

It is still further desired to provide a system that will reduce installation, maintenance and operating costs associated with air suspension systems.

It is yet further desired to provide a simple, easy to install, and highly reliable air suspension system.

SUMMARY OF THE INVENTION

These and other objects of the invention are achieved by minimizing the air losses of the air suspension system during normal operation. In one advantageous embodiment an air restriction valve is inserted between the height control valve and the air spring. In another advantageous embodiment the air restriction valve is located between a source of pressurized air and the height control valve. The air restriction valve disconnects fluid coupling of pressurized air from the source to the height control valve such that the height control valve cannot introduce pressurized air into or exhaust air from the air spring during normal operation of the vehicle.

The air restriction valve is actuated by various control inputs which may be derived from any onboard vehicle data sensing system, which may include, but is not limited to, for instance, an automatic braking system signal, an electronic braking system signal, a signal from a motion sensor, an operator input, any other signal that may be generated by an onboard vehicle data sensing system, or combinations of the forgoing.

In one advantageous embodiment, an air suspension control system for a vehicle is provided comprising, a source of pressurized air and an air spring. The system further comprises a height control valve having an air inlet port connected to the source of pressurized air, an exhaust port connected to atmosphere and an air spring port connected to the air spring, the height control valve operable to selectively couple between: the air inlet port and the air spring port, the exhaust port and the air spring port, or a neutral position where the air inlet port, the air spring port, and the exhaust port are isolated from each other. The system still further comprises an air restriction valve fluidly coupled between the height control valve and the air spring, the air restriction valve operable to selectively open and close fluid communication between the height control valve and the air spring. The system also comprises a first control input for controlling the height control valve, the first control input based on a first parameter, and a second control input for controlling the air restriction valve, the second control input based on a second parameter, the second parameter being different from the first parameter. The system is provided such that the first parameter comprises a measured vehicle height and the second parameter is selected to control the air restriction valve such that air losses in the air suspension control system are minimized.

In another advantageous embodiment, a method for increasing the ride stability of a vehicle is provided comprising the steps of, selecting a vehicle height value, measuring an actual vehicle height value, and comparing the selected vehicle height value to the measured vehicle height value to generate a correction signal. The method further comprises the steps of, operating a height control valve according to the correction signal to maintain the selected vehicle height value, generating a control signal corresponding to activation of an onboard vehicle system, the control signal being different than the correction signal, and selectively actuating a restriction valve with the control signal to selectively interrupt operation of the height control to increase ride stability of the vehicle.

In still another advantageous embodiment, a method for minimizing air loss in an air suspension control system for a vehicle is provided comprising the steps of, coupling an air inlet port of a height control valve to a source of pressurized air, coupling an exhaust port of a height control valve to the atmosphere, coupling an air spring port of a height control valve to an air restriction valve, and coupling the air restriction valve to an air spring. The method further comprises the steps of, measuring a first parameter, generating a first control input based on the first parameter for controlling the height control valve, and generating a second control input based on a second parameter for controlling the air restriction valve, said second parameter being different from said first parameter. The method still further comprises the steps of, applying the second control input to the air restriction valve, and selectively actuating the air restriction valve according to the second control input in order to prevent loss of pressurized air in the air suspension control system during operation of the vehicle.

In yet another advantageous embodiment, an air suspension control system for a vehicle is provided comprising, a height control valve having an air inlet port connected to a source of pressurized air, an exhaust port connected to atmosphere and an air spring port connected to an air spring. The height control valve being operable to selectively couple between the air inlet port and the air spring port, the exhaust port and the air spring port, or a neutral position where the air inlet port, the air spring port, and the exhaust port are isolated from each other. The height control valve being controlled by a correction signal corresponding to a first vehicle system parameter measured vehicle height. The system further comprises an air restriction valve coupled between the height control valve and the air spring, the air restriction valve operable to selectively restrict flow of pressurized air between the height control valve and the air spring such that air losses in the air suspension control system are minimized. The system still further comprises a control signal, for controlling the air restriction valve, the control signal corresponding to a second vehicle system parameter that is different from the first vehicle system parameter. The system is further provided such that the first vehicle system parameter corresponds to a measured vehicle height.

In still another advantageous embodiment a fluid control system is provided comprising a source of fluid and a fluid bag for receiving fluid therein. The system further comprises a control valve having an inlet port for receiving fluid from the source of fluid, an exhaust port for exhausting fluid from the fluid bag and a fluid bag port connected to the fluid bag, the control valve operable to selectively couple between: the inlet port and the fluid bag port, the exhaust port and the fluid bag port, or a neutral position where the inlet port, the fluid bag port, and the exhaust port are isolated from each other. The system still further comprises a restriction valve fluidly coupled to the control valve and operable to selectively open and close fluid communication to the source of fluid. The system yet further comprises a first control input for controlling the control valve, the first control input based on a first parameter, and a second control input for controlling the restriction valve, the second control input based on a second parameter, the second parameter being different from the first parameter. The system is further provided such that the first parameter comprises a measured vehicle height and the second parameter is selected to control said restriction valve such that cycling of the control system is minimized.

In yet another advantageous embodiment a method for minimizing air loss in a control system for a vehicle is provided comprising the steps of coupling a source of pressurized air to a restriction valve, coupling the restriction valve to an inlet port of a control valve, and coupling a fluid bag port of the control valve to a fluid bag. The method further comprises the steps of measuring a first parameter, and generating a first control input based on the first parameter for operating the control valve. The method still further comprises the steps of generating a second control input based on a second parameter for controlling the restriction valve, the second parameter being different from said first parameter, applying the second control input to the restriction valve, and selectively actuating the restriction valve according to the second control input such that cycling of the control system is minimized.

In still another advantageous embodiment an air suspension control system for a vehicle is provided comprising a height control valve having an air inlet port connected to a source of pressurized air, an exhaust port connected to atmosphere and an air spring port connected to an air spring, the height control valve operable to selectively couple between the air inlet port and the air spring port, the exhaust port and the air spring port, or a neutral position where the air inlet port, the air spring port, and the exhaust port are isolated from each other with the height control valve being controlled by a correction signal corresponding to a first vehicle system parameter measured vehicle height. The system further comprises an air restriction valve coupled to the height control valve to selectively restrict flow of pressurized air to the air spring such that air losses in the air suspension control system are minimized. The system still further comprises a control signal, for controlling the air restriction valve, the control signal corresponding to a second vehicle system parameter that is different from the first vehicle system parameter.

The invention and its particular features and advantages will become more apparent from the following detailed description considered with reference to the accompanying drawings.

DETAILED DESCRIPTION OF THE DRAWINGS

Figure 1:
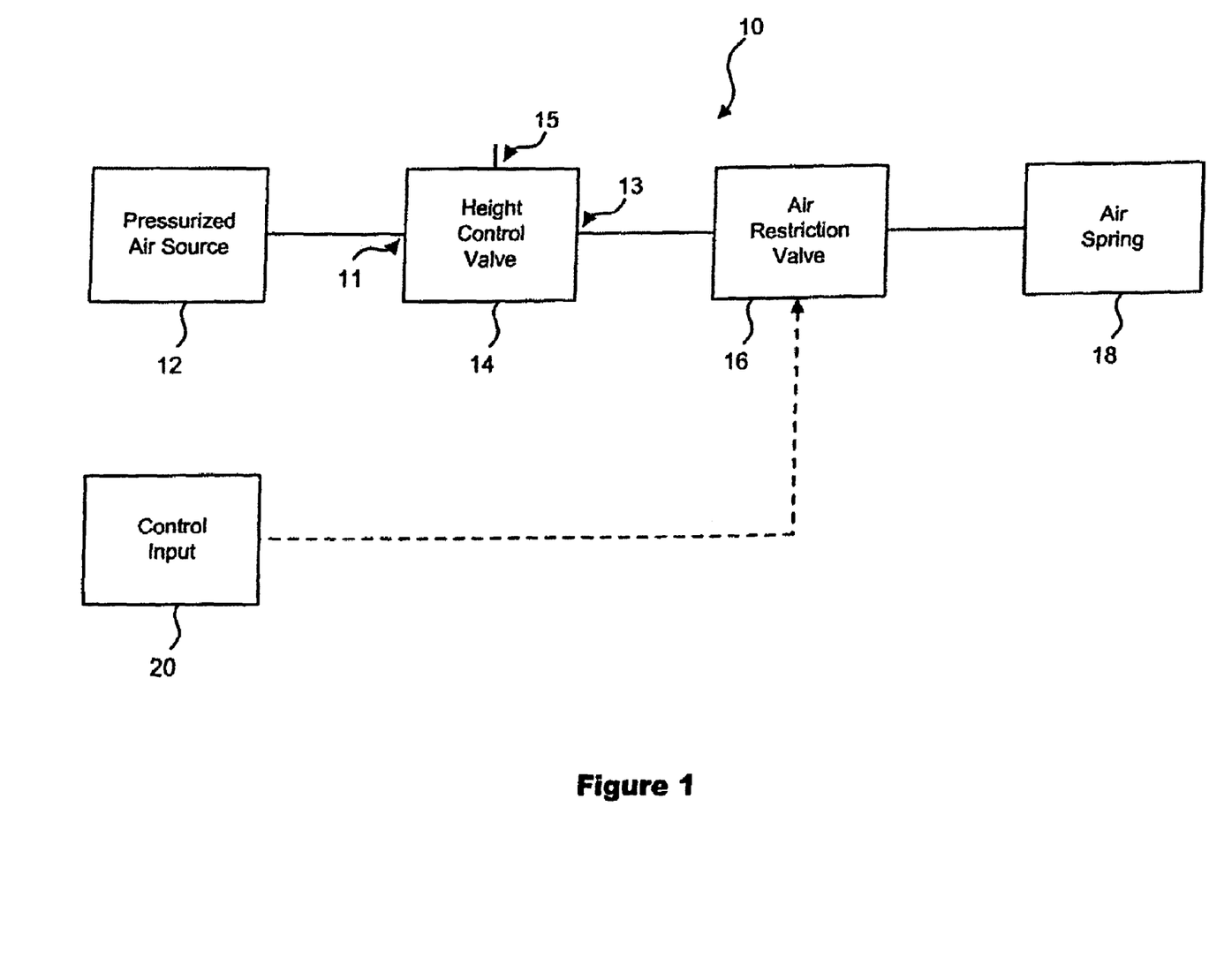
FIG. 1 is a block diagram illustrating one advantageous embodiment of the present invention.

Referring to the drawings and to FIG. 1 in particular, one advantageous embodiment of the air suspension system 10 is illustrated as a block diagram. The air suspension system 10 is provided with a pressurized air source 12 that is fluidly coupled to height control valve 14.

Height control valve 14 operates in a conventional manner having an air inlet port 11, an air spring port 13, an exhaust port 15 and a central bore or cavity (not shown) through which the ports are selectively in fluid communication with each other. Air inlet port 11 is provided to receive pressurized air from pressurized air source 12. Further, air spring port 13 is provided to fluidly couple height control valve 14 to an air spring 18. In addition, exhaust port 15 is provided to fluidly couple height control valve 14 to the atmosphere.

Although the operation of height control valve 14 is typical, for clarity, it will be described herein. Height control valve 14 receives a transducer input (not shown) which corresponds to a measured value of the distance between a trailing arm (not shown) and a vehicle frame (not shown). The measured value is compared with a selected reference value to determine whether it is greater than, less than or equal to the selected reference value. If the measured value is greater than the selected reference value, the height control valve will open fluid communication between the air spring port 13 and the exhaust port 15 to exhaust air from air spring 18, thereby reducing the distance between the trailing arm (not shown) and the vehicle frame (not shown). Alternatively, if the measured value is less than the selected reference value, the height control valve will open fluid communication between the air spring port 13 and air inlet port 11 to introduce additional pressurized air into air spring 18, thereby increasing the distance between the trailing arm (not shown) and the vehicle frame (not shown). Finally, if the measured value is equal to the selected reference value or a range of reference values, the height control valve 14 will maintain the ports in fluid isolation from one another.

A problem occurs, however, when during normal operation of the vehicle, oscillations occur, for instance, from shifting of the vehicle from side-to-side, front-to-back or a combination thereof. The height control valve receives a constantly varying measured value of the distance between the trailing arm (not shown) and the vehicle frame (not shown) and therefore continuously cycles the system to add air to or exhaust air from air spring 18 in response to the measured value. This however, wastes a large amount of compressed air.

In response to this problem, air restriction valve 16 is provided and located between height control valve 14 and air spring 18. Air restriction valve 16 is provided such that fluid communication between height control valve 14 and air spring 18 is restricted when air restriction valve 16 is actuated. Air restriction valve 16 may comprise any suitable valve assembly for use with vehicles that is appropriate to selectively facilitate or restrict fluid communication between height control valve 14 and air spring 18. It should also be noted that air restriction valve 16 may comprise a valve assembly that only partially restricts, or alternatively, completely severs fluid coupling between height control valve 14 and air spring 18.

By reducing or even eliminating the cycling of the air suspension system, ride height management will be greatly improved. The air suspension system will cycle less often, which will result in less wear on the system, and will reduce the costs involved with running the system. Another advantage is that ride stability will be enhanced. This is because the exhausting and addition of compressed air to the air springs in response to the oscillating of the vehicle will in itself cause the vehicle to sway and pitch in a cyclical fashion. This is highly undesirable as it tends to erode ride stability, which is very important for large profile vehicles. The present system will not destabilize the vehicle as do many other systems that cycle during normal operation of the vehicle.

Figure 1A:
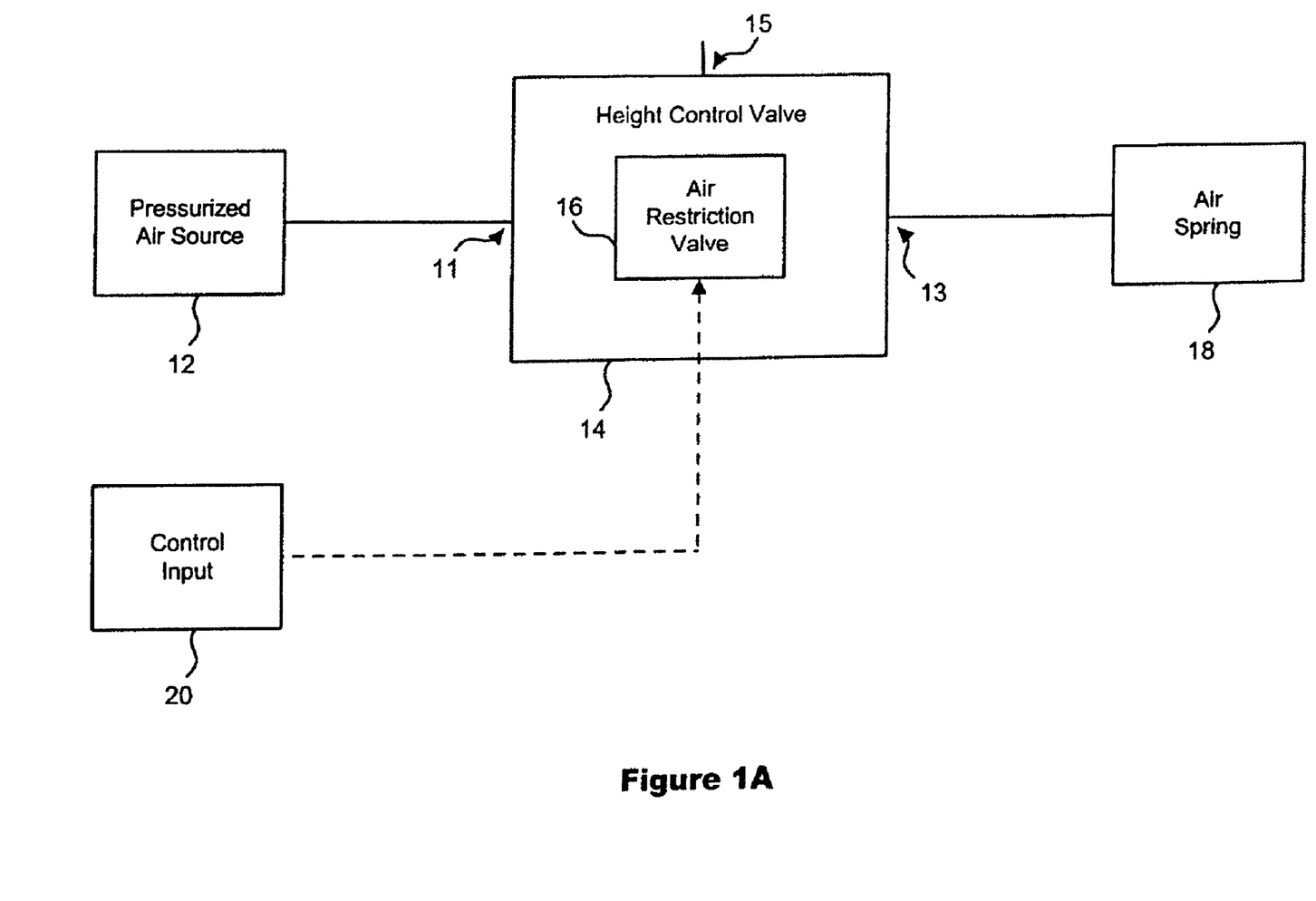
FIG. 1A is a block diagram illustrating another advantageous embodiment of the present invention.
Figure 1B:
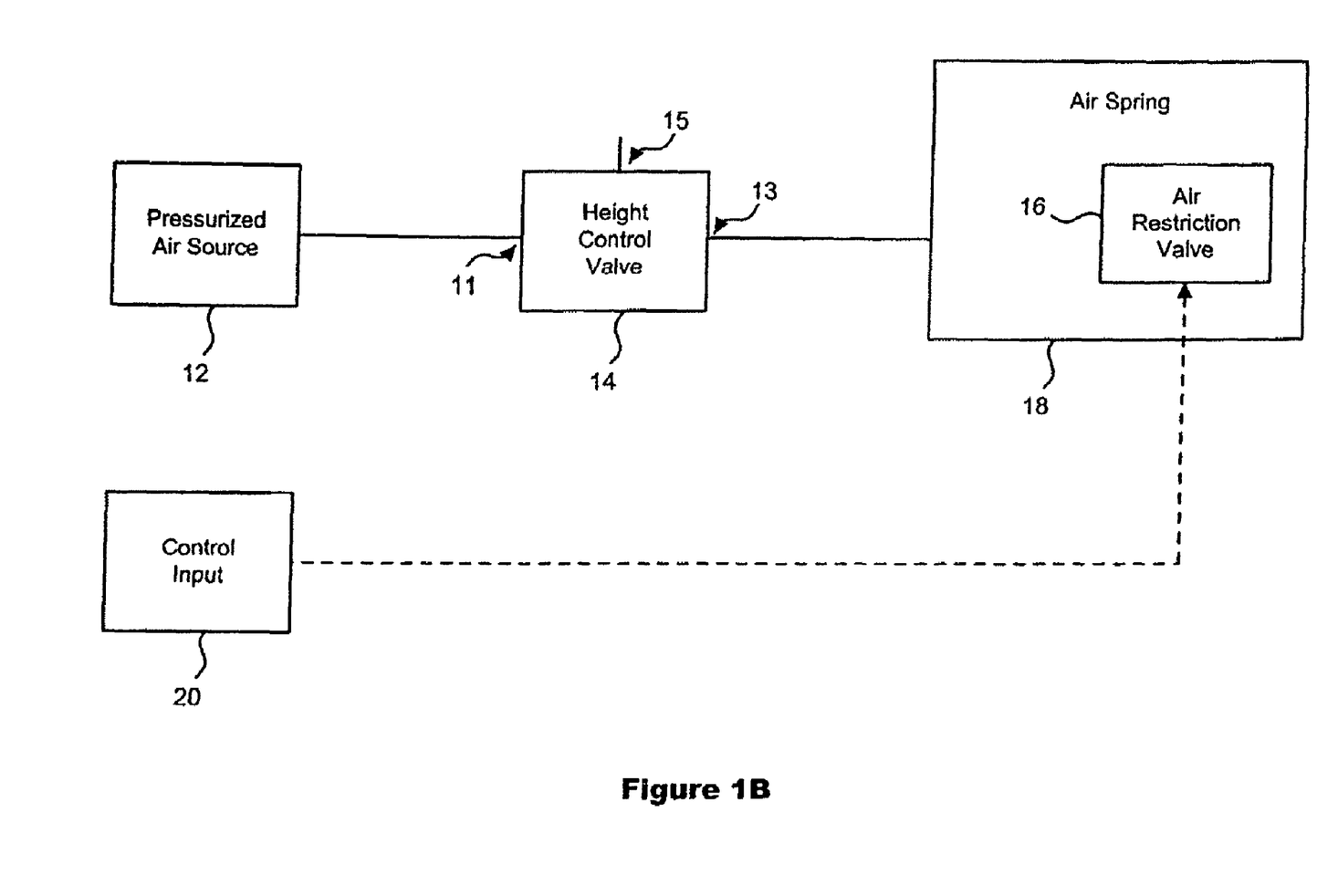
FIG. 1B is a block diagram illustrating still another advantageous embodiment of the present invention.

Although air restriction valve 16 is illustrated in one embodiment in FIG. 1 as separate from height control valve 14 and air spring 18, this is not required. For instance, air restriction valve 16 may be plumbed into the air line and be physically separated from both height control valve 14 and air spring 18 as illustrated in FIG. 1. Alternatively, air restriction valve 16 may be integrally formed into height control valve 14 as illustrated in FIG. 1A, or air restriction valve 16 may still further be integrally formed into air spring 18, as illustrated in FIG. 1B. It is contemplated that the physical location of air restriction valve 16 may vary depending upon the vehicle design. Alternatively, height control valve 14 may be located between the pressurized air source 12 and height control valve 14 as illustrated in FIG. 1C

Air restriction valve 16 is further provided with control input 20. Control input 20 will selectively actuate air restriction valve 16 according to selected control logic. It is desirable that, during normal operation of the vehicle, air restriction valve 16 restricts fluid communication between height control valve 14 and air spring 18 in order to minimize air losses due to, for instance, vehicle oscillations. It is generally desired to have the height control system activated, for instance, when the vehicle is being loaded or unloaded thereby causing a large change in weight or a shifting of load, when the vehicle is approaching a loading dock and the trailer height must be adjusted to match the loading dock height, when the tracker is being disconnected from or attached to the trailer, or when, for instance, a large weight shift occurs thereby necessitating an adjustment of the air springs to level the trailer.

Figure 1C:
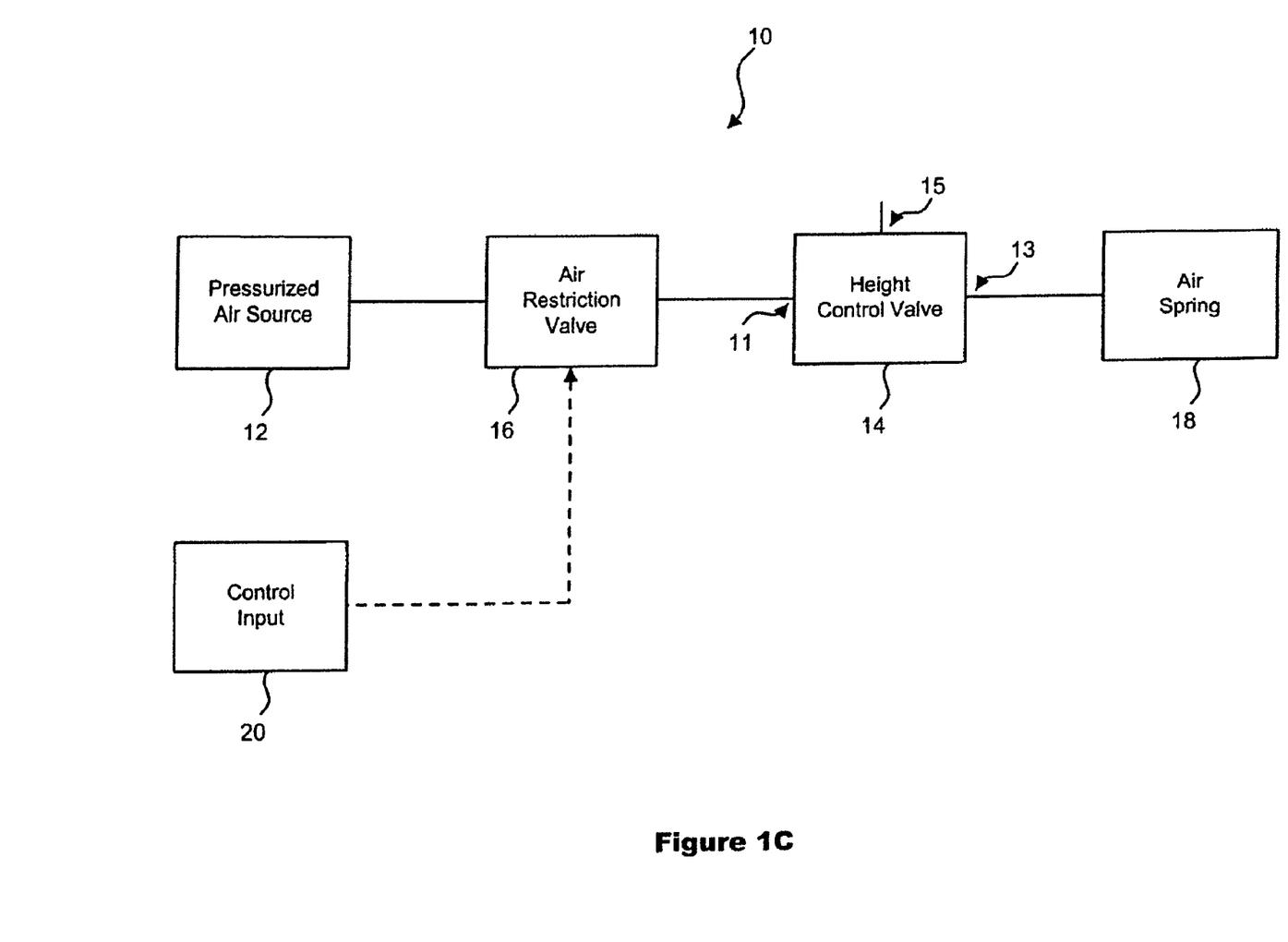
FIG. 1C is a block diagram illustrating yet another advantageous embodiment of the present invention.
Figure 2:
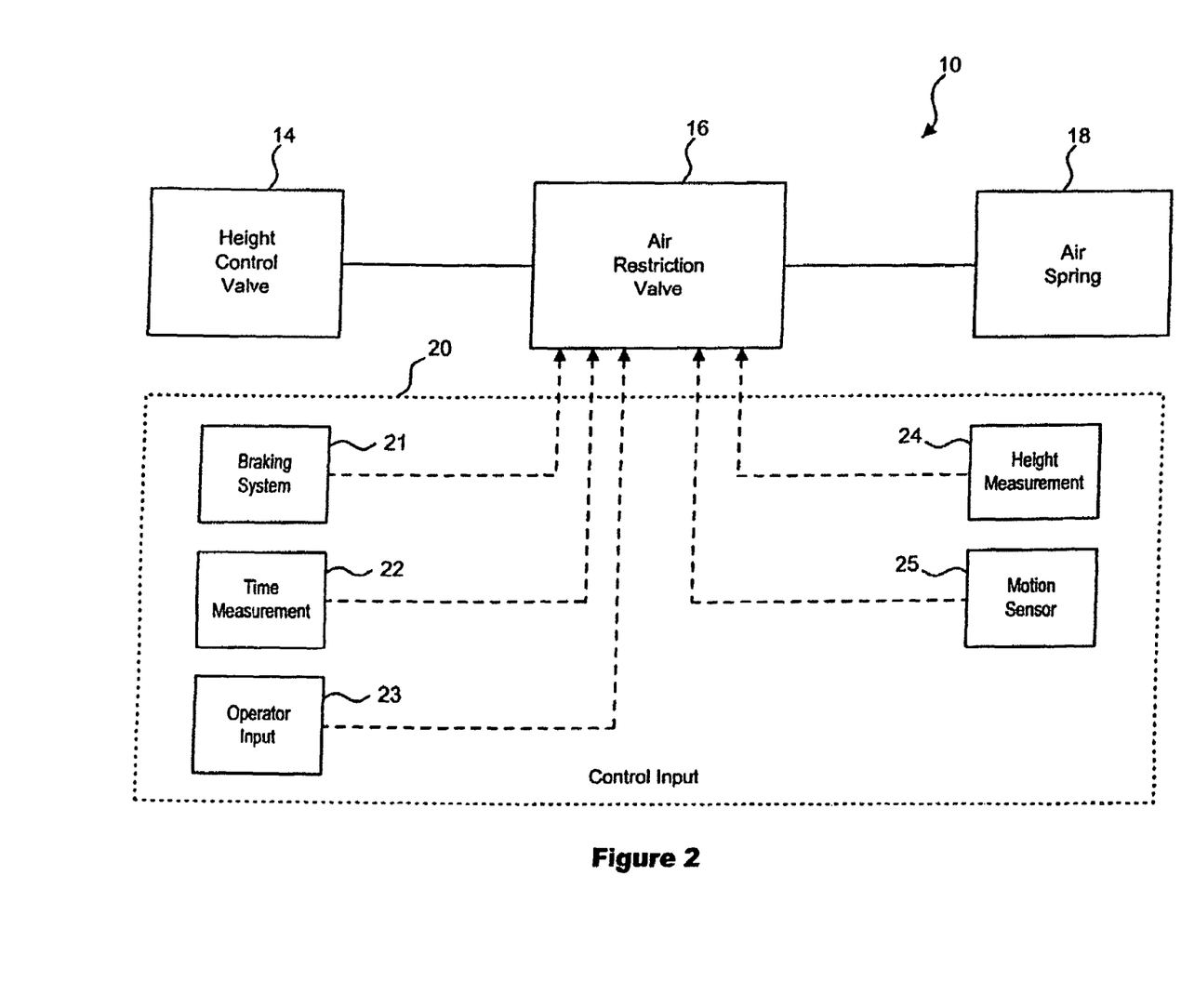
FIG. 2 is a block diagram according to FIG. 1 illustrating the control input in greater detail.
Figure 2A:
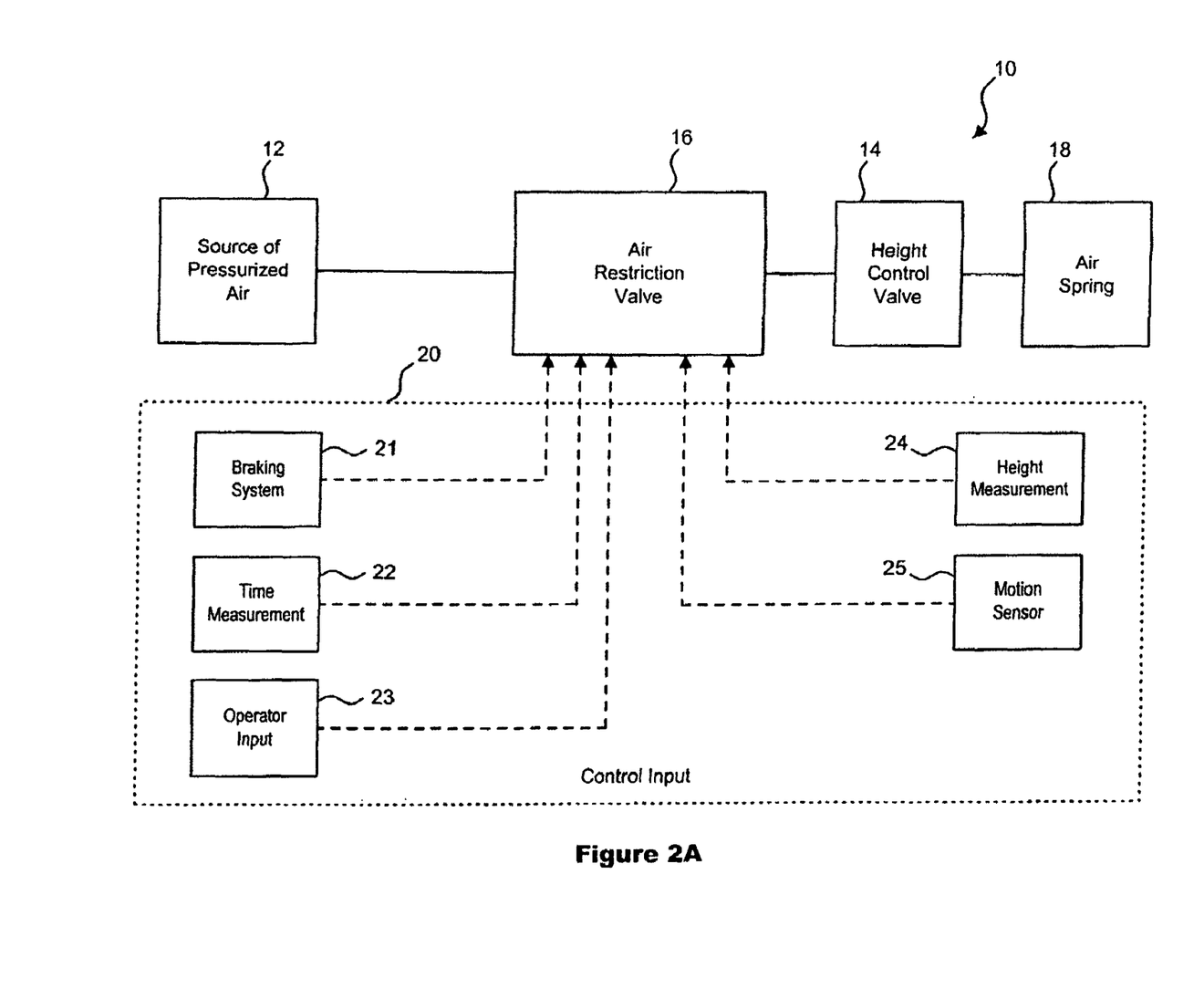
FIG. 2A is a block diagram according to FIG. 1C.

FIGS. 2 and 2A are block diagrams according to FIGS. 1 and 1C respectively that illustrate control input 20 in greater detail. Although a number of inputs are illustrated in FIG. 2, control input 20 may comprise any number of inputs from, for instance but not limited to, onboard vehicle data sensing and control systems.

Control input 20 may comprise, for instance, but is not limited to, a Braking System signal 21, which may include, for instance, a signal form an Anti-Lock Braking System (ABS), a Traction Control System (ASR), or an integrated Coupling Force Control (CFC). Control input 20 may also comprise a Time Measurement signal 22, which may include for instance, a measured elapsed time from a specified event or system activation. Control input 20 may further comprise an operator input signal 23, which may be a manually input signal to override the system or an automatic signal programmed into the system by the operator. Control input 20 may still further comprise a height measurement signal 24, which may for instance, be a measurement of the height of the vehicle frame, trailing arm or any other portion of the vehicle. Control input 20 may yet further comprise a motion sensor(s) signal(s) 25, which may be locate on the tractor or the trailer to measure movement of the vehicle. It is contemplated that control input 20 may comprise any number of vehicle data and/or control signals and the specific signals listed here are not meant to be a comprehensive list, but only to give examples of various signals that may be derived from various vehicle and operator systems. It should also be noted that control input 20 may comprise any one of, or any combination of vehicle data and/or control signals as desired for the particular application. In fact, it is contemplated that new vehicle safety systems will continue to emerge that enhance safety on the road.

The various system signals listed in conjunction with control input 20 were selected because of the impact the vehicle system could have on ride stability. For instance, in connection with the breaking systems, ABS prevents the wheels of a vehicle from locking during braking. Sudden changes in vehicle velocity may cause a dramatic shift in vehicle load which, in turn, may require air suspension system 10 to adjust air spring 18 to rebalance the trailer. Alternatively, ASR is used to ensure that none of the wheels on the driven axle spin during acceleration thereby ensuring optimal traction with the road surface. This again, is a situation where there may be a dramatic shift in vehicle load that would require air suspension system 10 to adjust air spring 18 to compensate for load shifts. As a further alternative, the Braking System signal 21 could be generated by an Electronic Braking System (EBS) that integrates ABS and ASR functions into a single system and signal. Still further, a control signal from an integrated Coupling Force Control (CFC), which modifies braking force distribution and harmonizes braking between tracker and trailer, may be utilized in connection with control input 20.

The other various signals listed in conjunction with control input 20 may also have an impact on ride stability. For instance, Height Measurement Signal 24 may be utilized, such that, if a vehicle load does shift thereby changing the distance between the trailing arm and the vehicle frame beyond a threshold value, the air suspension system 10 can adjust air spring 18 to re-level the trailer. In yet another example, a Motion Sensor Signal 25 can be utilized to sense motion of the vehicle such that fluid coupling between height control valve 14 and air spring 18 is restricted during normal operation of the vehicle to minimize air losses and stop cycling of the equipment. An operator input signal 23 may also be utilized in connection with control input 20 in which, for instance, the vehicle operator may want to, temporarily disconnect air restriction valve 16 so that height control valve 14 can continuously operate air spring 18 during normal vehicle operation or the vehicle operator may want to disconnect the air suspension system for a period of time.

Figure 3:
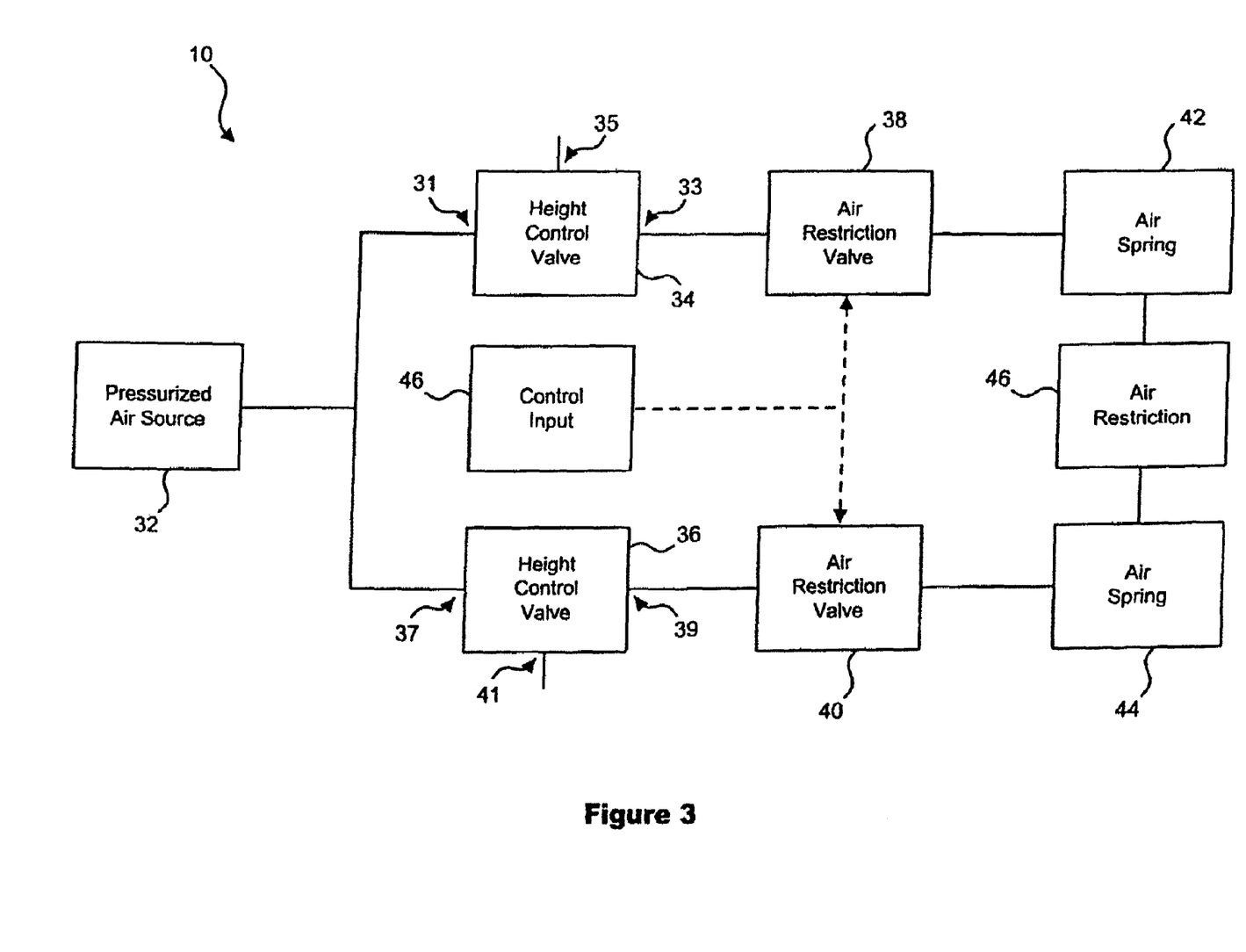
FIG. 3 is a block diagram illustrating yet another advantageous embodiment of the present invention.
Figure 3A:
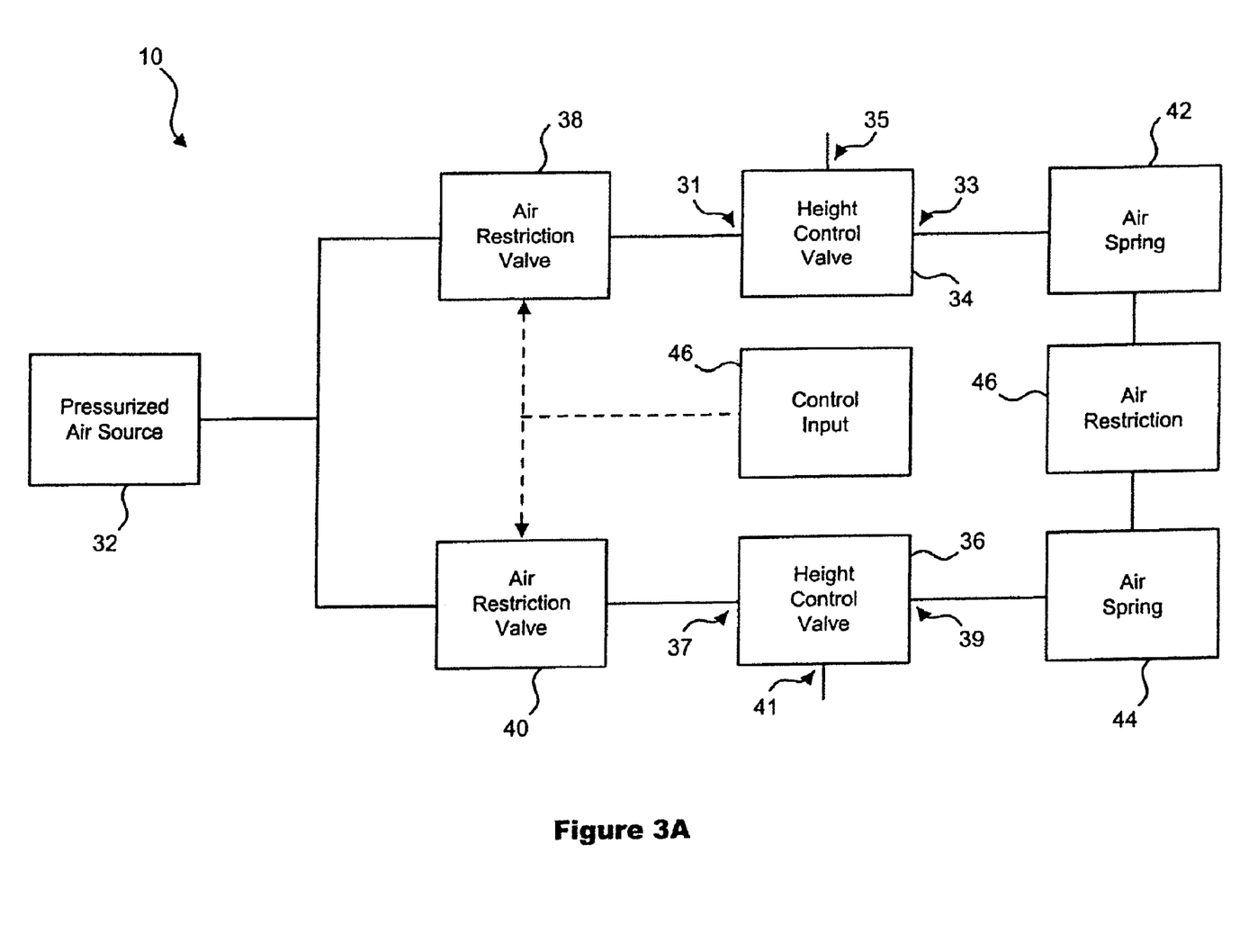
FIG. 3A is a block diagram illustrating still another advantageous embodiment of the present invention.

Referring to FIGS. 3 and 3A, another embodiment of air suspension system 10 is illustrated in a block diagram form. In this embodiment, air suspension system 10 comprises a pressurized air source 32 fluidly coupled to inlet port 31 of height control valve 34 and inlet port 37 of height control valve 36. In addition, height control valves 34 and 36 each have exhaust ports 35 and 41, respectively, that are each fluidly coupled to the atmosphere. Height control valves 34 and 36 further comprise inlet ports 33 and 39, that fluidly couple height control valves 34 and 36 to air restriction valves 38 and 40, respectively. Both height control valves 34 and 36 have a central bore or cavity (not shown) through which the ports are selectively in fluid communication with each other. Alternatively, air restriction valves 38 and 40 are both fluidly coupled between the source of pressurized air 32 and height control valves 34 and 36 respectively as shown in FIG. 3A. Air restriction valves 38 and 40 are similar to that previously described in connection with FIG. 1 and will not be described again here.

Both air restriction valves 38 and 40 are provided with control input 46. Control input 46 and the operation of height control valves 34 and 36 is similar to that as described in connection with FIG. 1 and therefore will not be repeated here.

Further illustrated in FIGS. 3 and 3A is air restriction 46. Air restriction 46 connects air spring 42 with air spring 44 through an air restriction. The purpose of air restriction 46 is to equalize the pressure in air springs 42 and 44. However, air restriction 46 restricts air flow from one air spring to another such that rapid equalization of the air springs through air restriction 46 is not possible. Rather, air restriction 46 allows only a very small amount of air through at a time such that, if a pressure differential does exist between air spring 42 and air spring 44, air restriction 46 will allow equalization over a period of time. The time period with vary, of course, depending upon the pressure differential.

While two height control valves, two air restriction valves and two air springs are illustrated in FIGS. 3 and 3A, it is contemplated that any number of these may be utilized depending upon the vehicle configuration and the desired vehicle control scheme. In addition, air restriction valves 38 and 40 that are depicted as separate and apart from height control valves 34 and 36 and air springs 42 and 44, may be manufactured integral to either the height control valves 34 and 36 or air springs 42 and 44 respectively, as previously illustrated in connection with FIGS. 1A, 1B and 1C.

Figure 4:
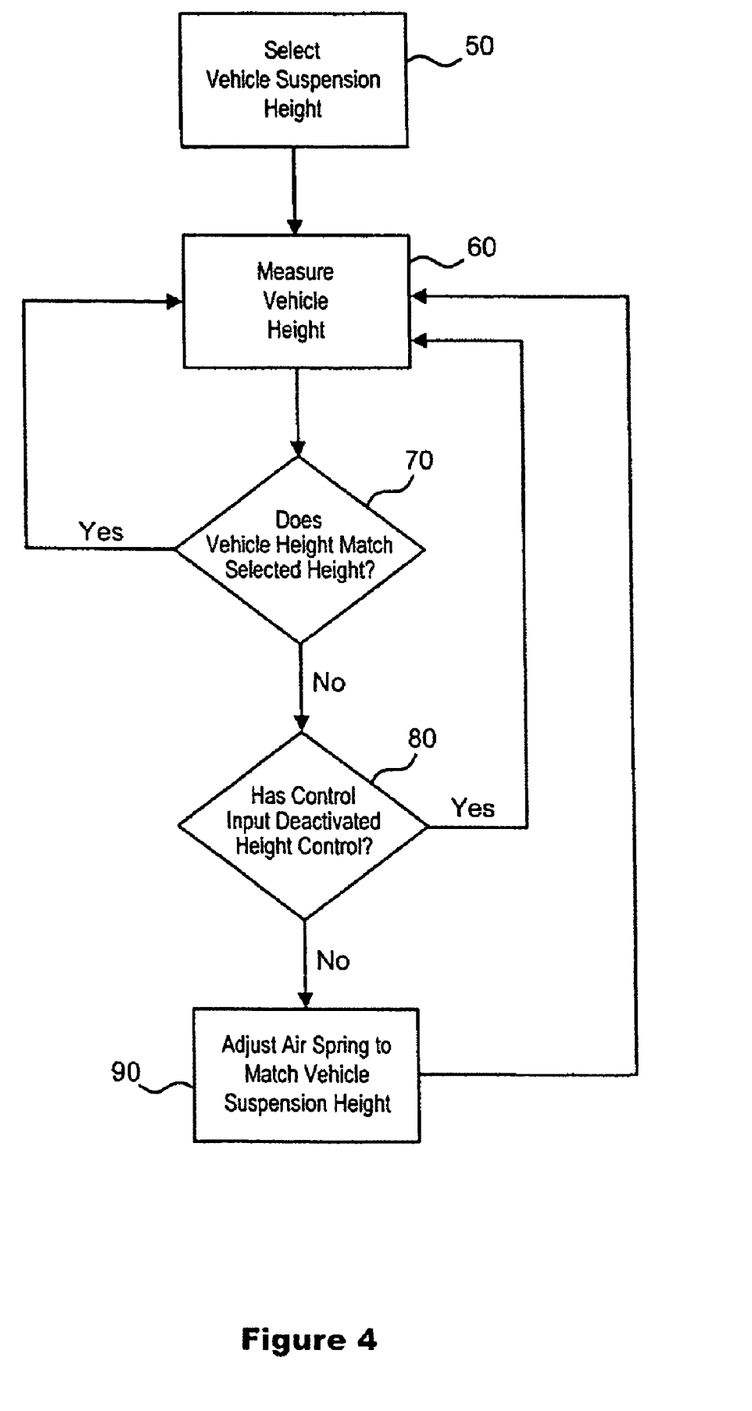
FIG. 4 is a flow diagram illustrating a sequence of operation for one advantageous embodiment of the present invention.

FIG. 4 is a flow diagram illustrating a sequence of operation for a method for minimizing air loss in an air suspension control system. For simplicity, the flow diagram in FIG. 4 will be discussed in conjunction with the air suspension system 10 illustrated in FIG. 1.

Initially, the operator will select the vehicle suspension height 50. This corresponds to the desired height between the trailing arm and the vehicle frame. Alternatively, this height may be automatically selected according to a manufacturer setting or an onboard vehicle control system, or this height may be manually selected. Once this height is selected, the system will measure the vehicle height 60. In many systems, height control valve 14 is mounted to the vehicle frame and is provided with a control arm that is connected to the trailing arm via a linkage arrangement. The linkage arrangement causes the control arm to rotate a control shaft inside height control valve 14 as the distance between the trailing arm and the vehicle frame varies. This, in turn, controls the introduction to or exhaustion of air from air spring 18. It is further contemplated that, although mechanical linkages have been and are widely utilized to measure the varying distance between the axle and vehicle frame, other measurement transducers may be effectively utilized including, but not limited to, light sensors, variable capacitors, variable resistors or any other transducer appropriate for use with vehicles.

Once a measured value of the vehicle height is obtained, the system determines if the vehicle height matches the selected height 70. This is accomplished by simply comparing the measured vehicle height with the selected height value or range of values, to generate one of either: a positive deviation, a negative deviation or no deviation. If the measured vehicle height matches the selected vehicle height such that there is no deviation, the system loops back to measure the vehicle height 60 and will continue this cycle until interrupted or a measured value does not match the selected value. If however the measured vehicle height does not match the selected vehicle height, having either a positive or a negative deviation, the system proceeds to determine if the control input has deactivated the height control 80. The height control system may be deactivated when, for instance, the control input 20 activates air restriction valve 16 to restrict fluid coupling between height control valve 14 and air spring 18. If it is determined that the air restriction valve 16 has been activated, then the system loops back to measure vehicle height 60 and will continue this cycle until interrupted or the system determines that air restriction valve 16 has not been activated. If, however, air restriction valve 16 has not been activated, the system proceeds to adjust the air spring in accordance with the measured height 90, either adding compressed air to, or exhausting compressed air from the air spring.

As was previously described in connection with FIG. 2, any number of varying vehicle data and control signals may be used to for control input 20 to control restriction valve 16. The logic sequence selected to control restriction valve 16 will vary depending upon the signals selected, of which, a number have been described with FIG. 2. Although a number of various control inputs have been illustrated and discussed in connection with control input 20, as has been previously stated, any number of various onboard vehicle data system inputs may be utilized to control air restriction valve 16. It is further contemplated that no particular order is critical in the analysis of onboard data and/or control signals corresponding to the control input.

In addition, the control logic for height control valve 14 and the corresponding adjustment of air spring 18 has also been previously described in connection with FIG. 1 and will not be repeated here.

Figure 5:
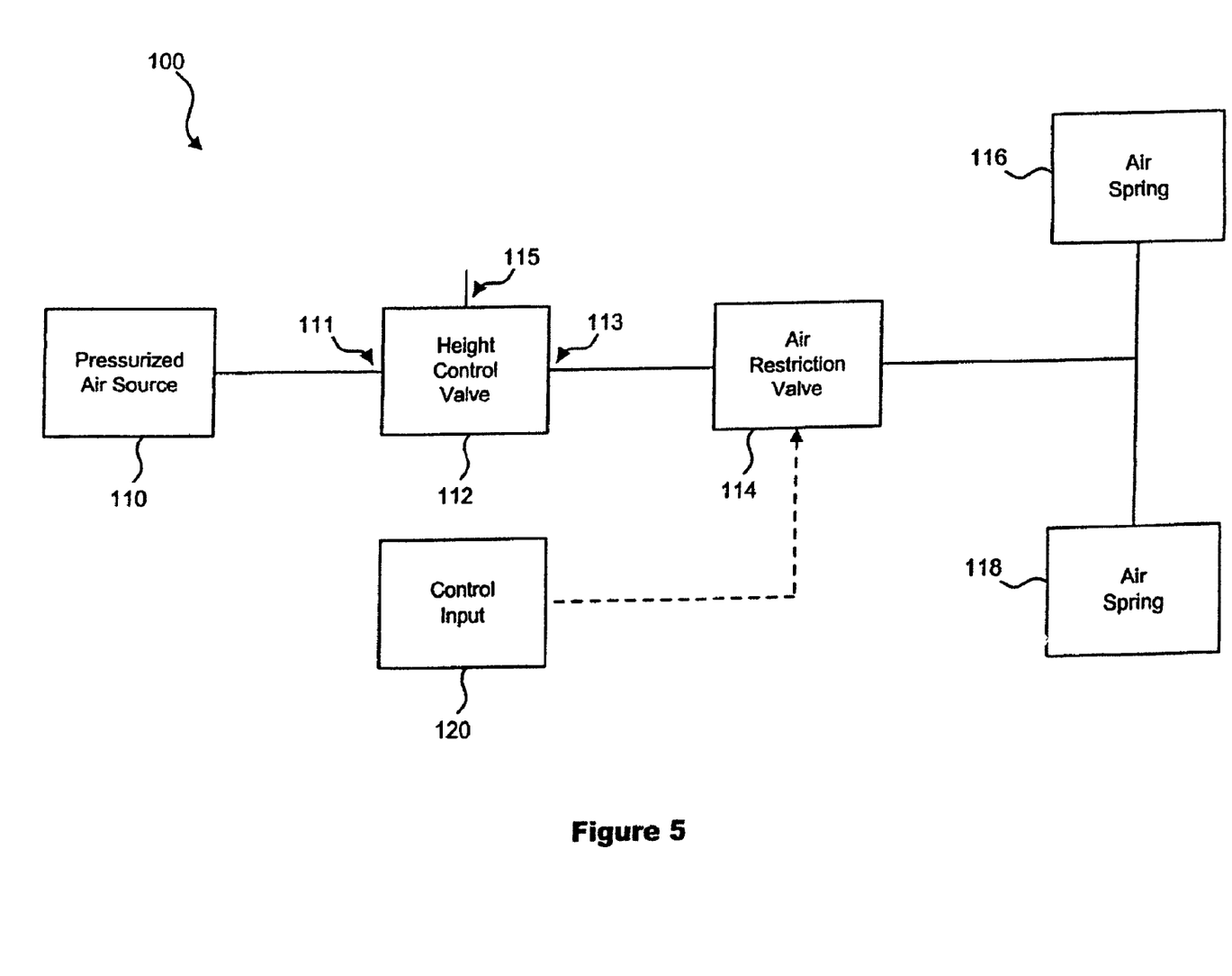
FIG. 5 is a block diagram illustrating still another advantageous embodiment of the present invention.
Figure 5A:
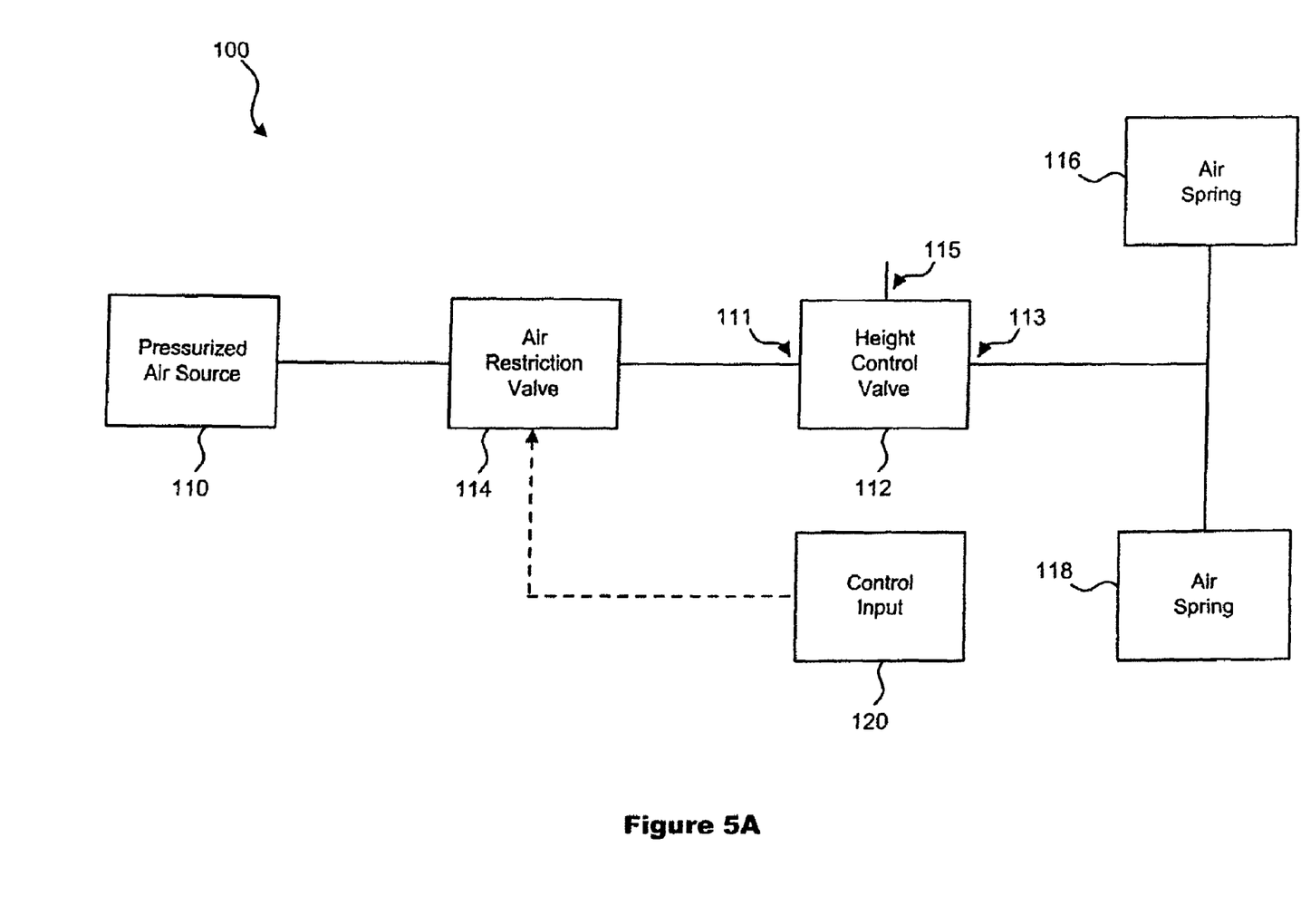
FIG. 5A is a block diagram illustrating yet another advantageous embodiment of the present invention.

FIGS. 5 and 5A are block diagrams of still other advantageous embodiments of the present invention. Depicted is an air suspension system 100. Air suspension system 100 comprises a pressurized air source 110 that is in fluid communication with height control valve 112 via air inlet port 111. Air suspension system 100 further comprises an air restriction valve 114 that is in fluid communication with height control valve 112 via air spring port 113. Height control valve 112 is also provided with an exhaust port 115 that may selectively be in fluid communication with air spring port 113. Air spring port 113 may still further be in fluid communication with air inlet port 111 based upon a selected logic. Alternatively, air restriction valve 114 may be located ahead of height control valve 112 as depicted in FIG. 5A.

Air restriction valve 114 is provided with a control input 120, which may include various onboard data and control signals as previously discussed in connection with FIG. 2.

Air spring 116 and air spring 118 are both shown fluidly connected with height control valve 112 such that both air springs are adjusted at simultaneously. This configuration has the advantage of fewer parts and therefore lower costs associated with installation and operation.

Figure 6:
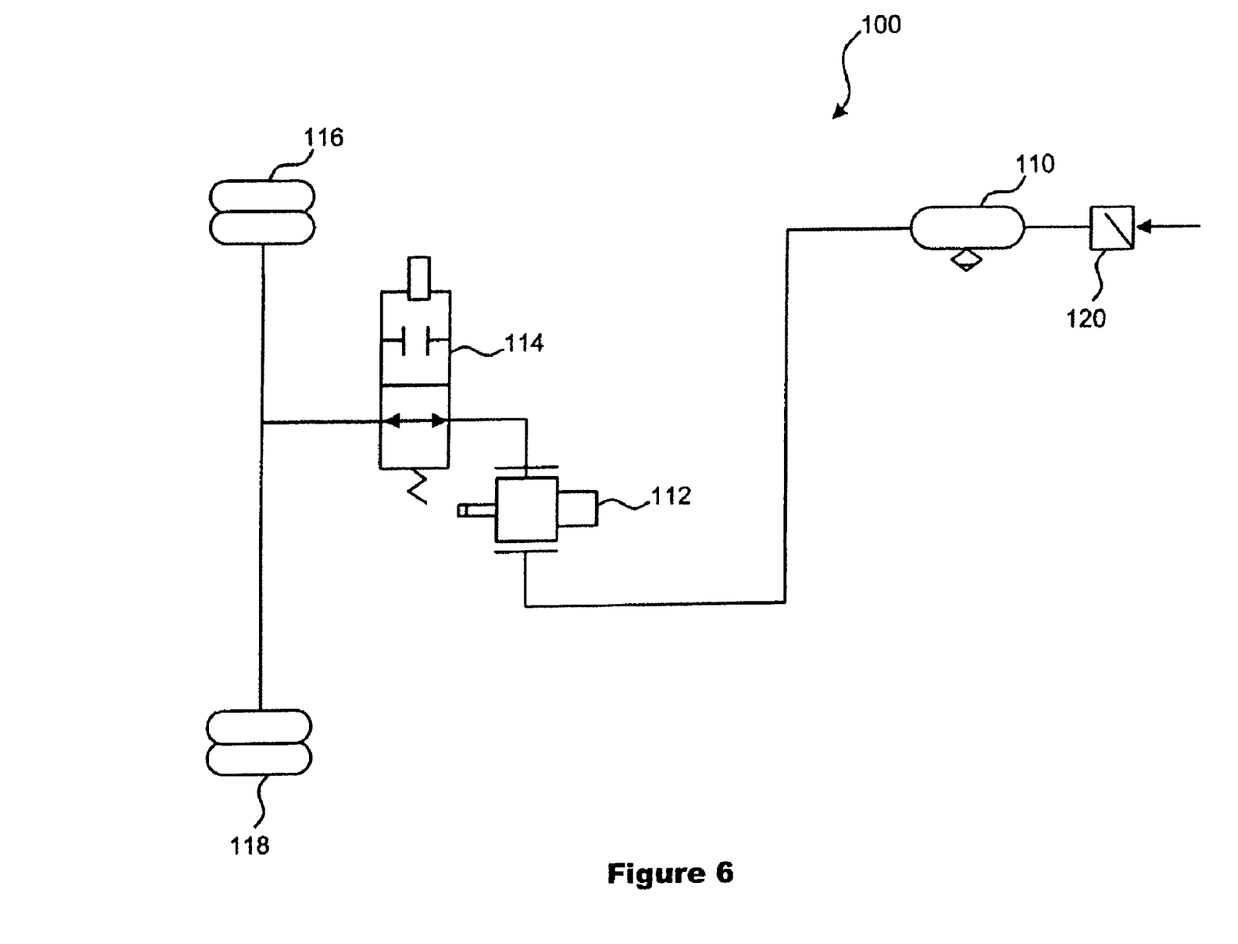
FIG. 6 is a piping diagram according to FIG. 5 illustrating an advantageous embodiment of the present invention.

FIG. 6 is a piping diagram of air suspension system 100 according to FIG. 5. As illustrated in FIG. 6, the piping diagram includes: an air inlet 120 to pressurized air source 110 connected to height control valve 112; height control valve 112 is in turn connected to air restriction valve 114; and air restriction valve 114 is connected to both air spring 116 and air spring 118. Alternatively, air restriction valve 114 may be located ahead of height control valve 112 as depicted in FIG. 5A.

It should be noted that, although air restriction valve 114 as illustrated as separate from height control valve 112 in FIGS. 5 and 6, it may be supplied integral with height control valve 112 as illustrated in FIG. 1A. Again, although air restriction valve 114 is illustrated as located between height control valve 112 and air spring 116 and 118, it is contemplated that it may advantageously be positioned ahead of height control valve 112.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A fluid control system comprising:
a source of fluid;
a fluid bag for receiving fluid therein;
a control valve having an inlet port for receiving fluid from the source of fluid, an exhaust port for exhausting fluid from the fluid bag and a fluid bag port connected to the fluid bag, said control valve operable to selectively couple between: the inlet port and the fluid bag port, the exhaust port and the fluid bag port, or a neutral position where the inlet port, the fluid bag port, and the exhaust port are isolated from each other;
a restriction valve fluidly coupled to said control valve and operable to selectively open and close fluid communication to said source of fluid;
a first control input for controlling said control valve, said first control input based on a first parameter; and
a second control input for controlling said restriction valve, said second control input based on a second parameter, said second parameter being different from said first parameter;
wherein said first parameter comprises a measured vehicle height and said second parameter is selected to control said restriction valve such that cycling of the control system is minimized.

2. The control system according to claim 1 wherein said restriction valve is located between said source of fluid and said control valve.

3. The control system according to claim 1 wherein the second parameter is selected from the group consisting of: anti-lock braking system, traction control, electronic braking system, motion sensors, an operator input, a time measurement or combinations thereof.

4. The control system according to claim 1 wherein said second control input is selected from the group consisting of: an electrical signal, a pneumatic signal, a mechanical signal or combinations thereof.

5. The control system according to claim 1 wherein said second control input automatically actuates said restriction valve based upon selected control logic.

6. The control system according to claim 1 wherein said restriction valve is separate from said control valve.

7. The control system according to claim 1 wherein said restriction valve is integrally formed with said control valve.

8. The air suspension control system according to claim 1 wherein said restriction valve is integrally formed with said fluid bag.

9. A method for minimizing air loss in a control system for a vehicle comprising the steps of:
coupling a source of pressurized air to a restriction valve;
coupling the restriction valve to an inlet port of a control valve;
coupling a fluid bag port of the control valve to a fluid bag;
measuring a first parameter;
generating a first control input based on the first parameter for operating the control valve;
generating a second control input based on a second parameter for controlling the restriction valve, the second parameter being different from said first parameter;
applying the second control input to the restriction valve; and
selectively actuating the restriction valve according to the second control input such that cycling of the control system is minimized.

10. The method according to claim 9 wherein the second parameter is selected from the group consisting of: anti-lock braking system, traction control, electronic braking system, motion sensors, an operator input, a time measurement or combinations thereof.

11. The method according to claim 9 wherein the second control input is selected from the group consisting of: an electrical signal, a pneumatic signal, a mechanical signal or combinations thereof.

12. An air suspension control system for a vehicle comprising:
a height control valve having an air inlet port connected to a source of pressurized air, an exhaust port connected to atmosphere and an air spring port connected to an air spring, said height control valve operable to selectively couple between the air inlet port and the air spring port, the exhaust port and the air spring port, or a neutral position where the air inlet port, the air spring port, and the exhaust port are isolated from each other, said height control valve being controlled by a correction signal corresponding to a first vehicle system parameter measured vehicle height;
an air restriction valve coupled to the height control valve to selectively restrict flow of pressurized air to the air spring such that air losses in the air suspension control system are minimized; and
a control signal, for controlling said air restriction valve, said control signal corresponding to a second vehicle system parameter that is different from the first vehicle system parameter.

13. The air suspension control system according to claim 12 wherein the first vehicle system parameter corresponds to a measured vehicle height.

14. The air suspension control system according to claim 12 wherein said air restriction valve is coupled between said source of pressurized air and said height control valve.

15. The air suspension control system according to claim 12 wherein the second vehicle system parameter is selected from the group consisting of: anti-lock braking system, traction control, electronic braking system, motion sensors, an operator input, a time measurement or combinations thereof.

16. The air suspension control system according to claim 12 wherein the control signal is selected from the group consisting of: an electrical signal, a pneumatic signal, a mechanical signal or combinations thereof.

17. The air suspension control system according to claim 12 wherein said control signal automatically actuates said air restriction valve based upon selected control logic.

* * * * *